United States Patent [19]

Malcolm

[11] 4,279,051
[45] Jul. 21, 1981

[54] COMBINATION WATER SPRAY AND ROTARY BRUSH ATTACHMENT

[76] Inventor: Elmer L. Malcolm, Rte. 2, Gentry, Ark. 72734

[21] Appl. No.: 66,558

[22] Filed: Aug. 15, 1979

[51] Int. Cl.³ .............................................. A46B 13/06
[52] U.S. Cl. .................................................... 15/29
[58] Field of Search ................. 15/22 R, 24, 29, 97 R, 15/50 R

[56] References Cited

U.S. PATENT DOCUMENTS

| | | | |
|---|---|---|---|
| 1,343,490 | 6/1920 | Albertson | 15/29 X |
| 2,678,457 | 5/1954 | Demo et al. | 15/29 |
| 2,759,208 | 8/1956 | Williams | 15/29 |

FOREIGN PATENT DOCUMENTS 580298  7/1958  Italy .............................................. 15/29

*Primary Examiner*—Edward L. Roberts
*Attorney, Agent, or Firm*—Harvey B. Jacobson

[57] ABSTRACT

A water powered cleaning device is disclosed with particular utility for car washing. The hand held device has a motor powered by water supplied under pressure, which motor operates a rotary brush lubricated by water flowing through the motor. A water switching arrangement permits selection of direct water spray from the device or brush rotation, which is adapted to remove dirt and film left after completion of the spraying operation. In one primary form of use of the device, the user carries the device to a conventional self-service car wash facility, attaches the device to the metal pipe outlet, wherein water under pressure is furnished.

8 Claims, 8 Drawing Figures

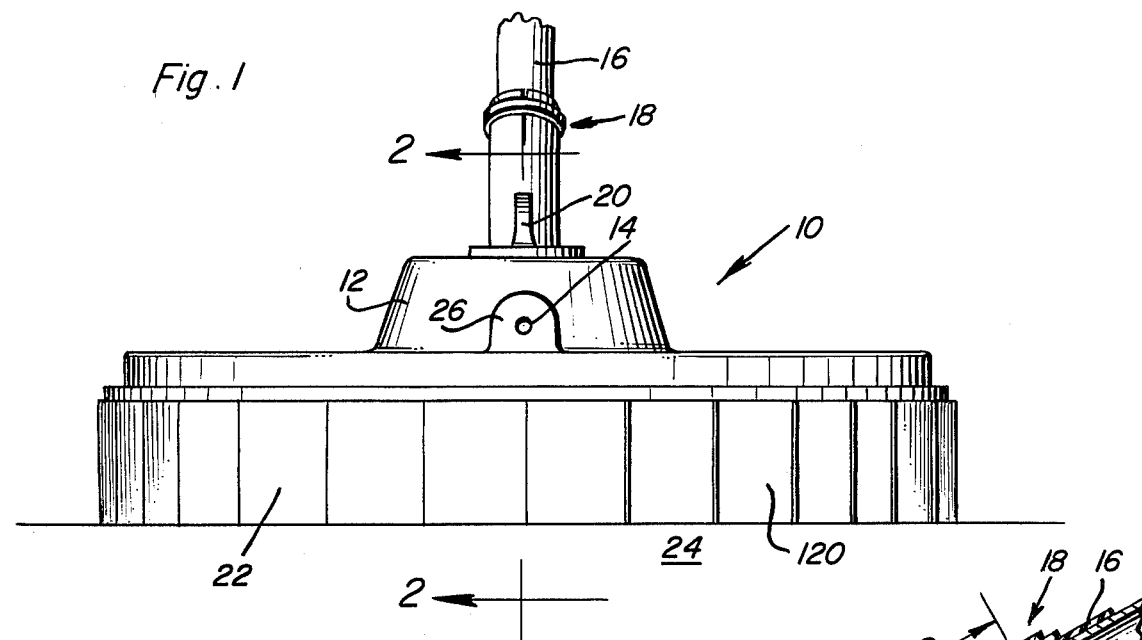
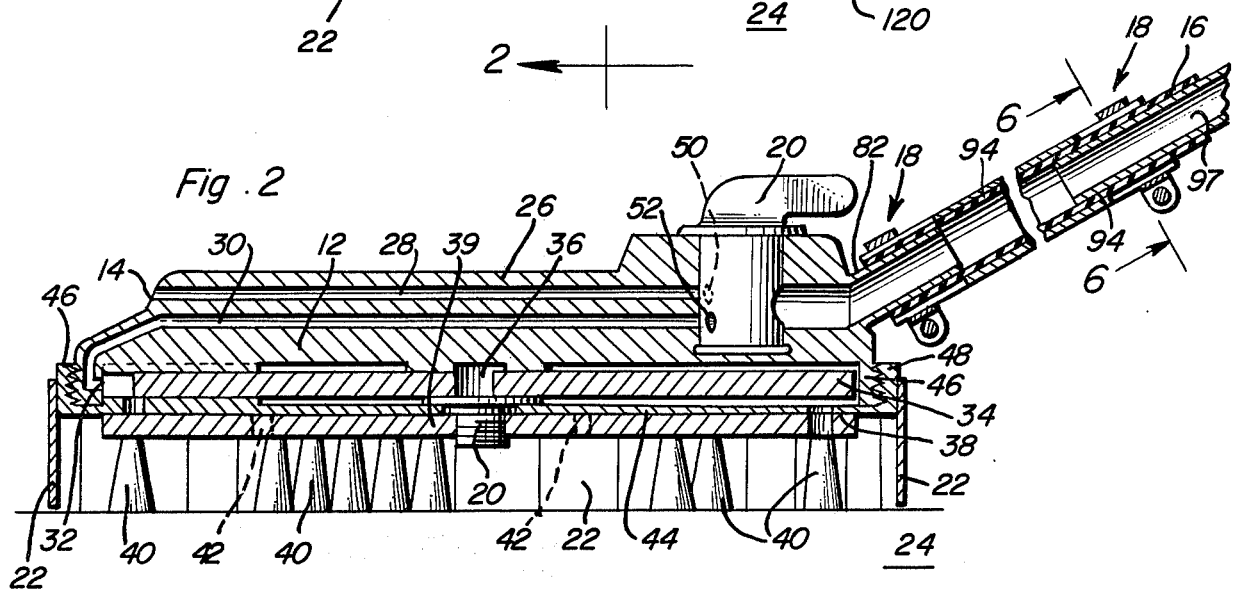
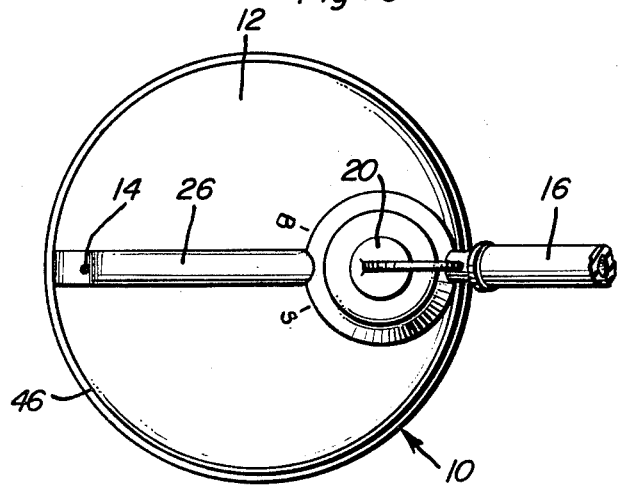
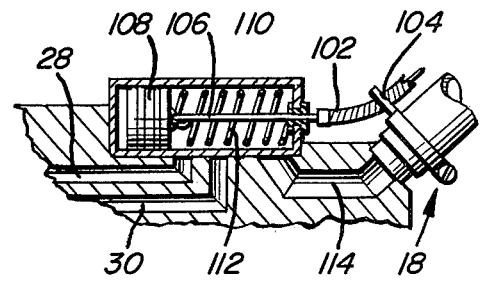

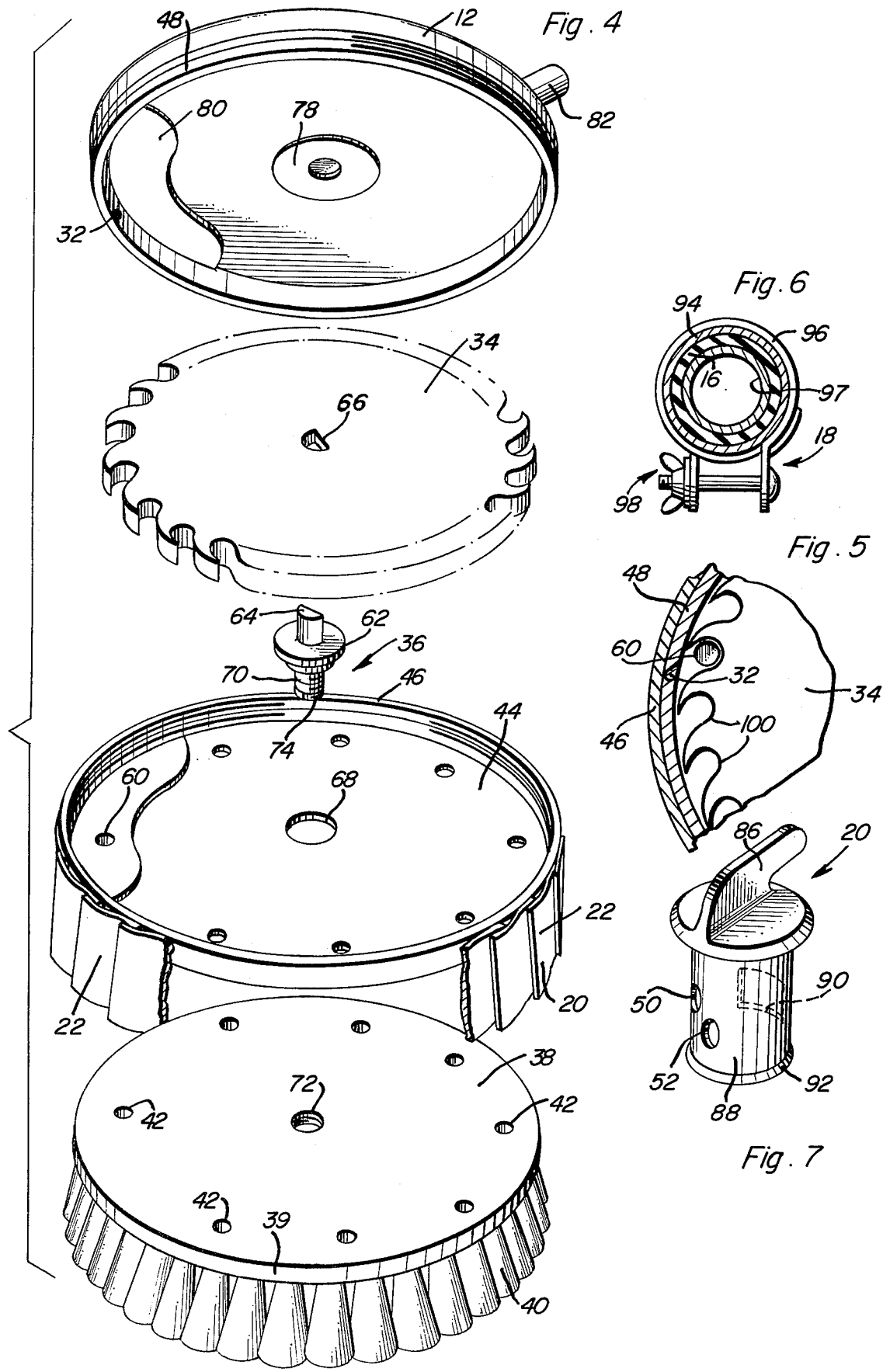

COMBINATION WATER SPRAY AND ROTARY BRUSH ATTACHMENT

BACKGROUND OF THE INVENTION

1. Field of the Invention

The invention relates to portable hand held washing devices, particularly to an attachment enabling selection of either direct water spray or a rotary brush which is driven by a water powered motor. The invention is particularly useful in the field of automobile washing, in which field of technology it is important to remove the dirt and film left after spraying.

2. Disclosure Statement

The following patents are deemed to pertain to the field of the invention:

| U.S. Pat. Nos.: | 846,636 | Mar. 12, 1907 |
|---|---|---|
| | 944,679 | Dec. 28, 1909 |
| | 1,821,394 | Sep. 1, 1931 |
| | 2,678,457 | May 18, 1959 |
| | 2,759,208 | Aug. 21, 1956 |
| | 2,918,686 | Dec. 29, 1959. |

The Lawler patent shows a rotary brush having an elongated handle for gripping the housing of a brush assembly and delivering water under pressure to the brush assembly, where the water is delivered through propelling jets to blades of a water wheel which rotates an annular brush mounted on the threaded shaft. The Moschetto patent shows a rotary brush propelled by tangential projection of water under pressure on a propeller, and an annular dam or barrier of flexible material, such as rubber, surrounds the brush to confine water discharged through the brush. The Swearngin patent shows a rotary water-powered brush specifically adapted for washing automobiles, employing spiral channels in a circular disk to contain flowing water, which disk imparts rotary motion to the brush. The Wensinger patent shows a rotary brush in association with means for discharging water directly upon a surface to be cleaned by the brush.

SUMMARY OF THE INVENTION

A need exists for a water powered attachment to selectively direct a water spray or effect rotation of a brush driven by a water powered motor within the attachment. A switch mounted for manual access directs water into either the spray mode or the brushing mode, and water flowing through the motor and powering the brush lubricates the brush and provides wash water when the brush is in use.

Accordingly, it is a primary object of the invention to provide a combination water spray and rotary brush attachment powered by a water driven motor, where the user can select either a direct water spray on an object undergoing a washing operation, or can select the water power driven revolving brush operation.

Another object is to provide a combination water spray and rotary brush attachment wherein the brush is lubricated by water which flows through the motor.

Still another object is to provide a switching device to enable the user to choose either direct water spray or a revolving brush mode of operation.

Yet another object is to provide a combination spray and brush attachment which is useful for automobile washing, where the water powered brush removes dirt and film left after completion of a spraying operation.

A further object is to provide a combination spray and brush attachment which can be operated by relatively low water pressure, such as about 35 to 40 psig.

Another further object is to provide a combination water spray and brush attachment useful for washing windows, automobiles, metal buildings, and the like.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a front, side elevational view of the water spray and rotary brush attachment viewed in contact with a surface on which the attachment is adapted for operation.

FIG. 2 is a vertical sectional view of the device of FIG. 1, taken substantially upon a plane passing along section line 2—2 of FIG. 1.

FIG. 3 is a top plan view of the device of FIG. 1, showing details of the control switch mounted on the device housing.

FIG. 4 is a group perspective view of the components of the water motor and brush assembly.

FIG. 5 is a fragmentary, horizontal sectional view of the assembled device immediately above the power disk, showing details of the water inlet and outlet in relation to the pockets formed about the periphery of the power disk.

FIG. 6 is a transverse sectional view of the water line inlet showing details of the connecting device sealing the water inlet hose to the spray and brush attachment.

FIG. 7 is a perspective view of the control switch for selecting the spraying or brushing mode of operation.

FIG. 8 is a fragmentary sectional view of a control switch in a second form of the invention where extended handles are necessary, such as in commercial use for cleaning objects difficult to reach, such as tractor-trailer windows.

DESCRIPTION OF THE PREFERRED EMBODIMENTS

In FIG. 1, the water spray and rotary brush attachment of the present invention is designated generally by the numeral 10, comprising housing 12, spray orifice 14, flexible inlet hose 16, clasp 18, control switch 20, and protective skirt 22. Attachment 10 rests upon surface 24, which can be an automobile exterior, a metal building, a window, or the like.

Ridge 26, formed in housing 12, encloses waterline 28 for spray orifice 14. Immediately below water line 28 is water line 30, which feeds through inlet 32 to introduce water about the periphery of power disk 34. Power disk 34 is mounted centrally on brush mount shaft 36, which is threaded into brush 38 and rotates as power disk 34 is driven by water entering inlet 32. Brush 38 is provided with fiber bundles 40 embedded in circular brush plate 39, which contact surface 24 when control switch 20 is positioned to permit flow of water through line 30. Holes 42 in brush 38 allow water to be released into fiber bundles 40 and lubricate brush 38. Separating power disk 34 and brush 38 is bottom plate 44, which has an upwardly directed rim 46, which is shown in FIG. 2 as threaded internally for screwing onto compatibly threaded lower edge 48 of housing 12. Alternatively, bottom plate 44 can be cemented or otherwise attached to lower edge 48 of housing 12. In FIG. 3, it is apparent that two settings are possible for operation of attachment 10 (shown in FIG. 3 without the skirt 22). The setting for spray, in which a slight counterclockwise movement of control switch 20 from the position shown in FIG. 3 will be necessary, enables water under pressure entering through inlet line 16 to be directed into water line 28, inasmuch as control outlet 50 will be in alignment with water line 28 in such a position. However, a slight clockwise rotation of control switch 20 will place control outlet 52 in register with water line 30 thereby permitting water under pressure entering through water inlet hose 16 to be directed through inlet 32, thereby operating the water motor in the manner described above and causing rotary brushing action to commence. Such brushing action is indicated by the position identified "B" while spray action is identified by the letter "S".

FIG. 4 shows the internal components of the assembly exploded for viewing of the order of assembly. Shaft 36 is seen to be constituted of semi-cylindrical pin 64, receivable in compatible centrally located hole 66 in power disk 34. Shaft 36 is also made up of bearing segments 62, which spaces disk 34 from bottom plate 44 and provides a bearing surface about central hole 68 of plate 44. Threaded projection 70 of shaft 36 can be tightened on compatibly threaded hole 72 of brush 38. Slot 74 on shaft 36 enables shaft 36 to be held stationary as brush 38 is rotated for removal or reattachment. Housing 12 is provided with spacer annulus 78 to provide a tight fit for power disk 34 with respect thereto, and spacing segment 80 also facilitates a close fit and reduces excessive water leakage. Receiving pipe 82 extends outwardly from housing 12 to receive the water inlet line 16 on which clasp 18 is securely fastened.

Control switch 20 is best seen in FIG. 7 to comprise handle portion 86, body 88, water intake port 90, water control outlets 50 and 52, and retainer rim 92. Clasp 18 for joining hose 16 to attachment 10 is preferably provided with a length 94 of metal or equivalent tubing for imparting rigidity and a watertight seal. Pipe 97 is received inside of flex hose 16, whereby water under pressure is introduced into brush attachment 10. Clasp 18 is made up of ring 96, held in place by bolt means 98, which is conventional in construction.

Power disk 34, as best seen in FIG. 5, is provided about its periphery with a plurality of pockets 100, for receiving water from inlet 32. In flowing into inlet 32, the water directed into pockets 100 imparts a clockwise motion to power disk 34, thereby enabling shaft 36 to turn and forcing brush 38 to turn as well. Water emerging through hole 60 in bottom plate 44 then is free to find its way through holes 42 and brush 38, thereby lubricating the brush and assisting in the cleaning operation.

In a second form of the invention, shown in FIG. 8, cable 102, mounted by bracket 104 on clasp 18, is attached through link 106 to piston 108 in cylinder 110. Spring 112 opposes pulling motion on cable 102. By regulating the position of piston 108, water can be directed from channel 114 into water line 28 or water line 30 to perform the functions identical to those described in discussion of the first form of the invention illustrated in FIG. 2. The form of invention shown in FIG. 8, where a remote control of the switching is possible is for particular applications where extended handles are necessary, such as in commercial use of cleaning of tractor-trailer windows, and the like. As understood, the cable 102 is connected at its remote extremity to a lever (not shown) of conventional construction to enable link 106 to be moved to the desired position of spraying and/or brushing operation.

Skirt 22 is made up of overlapping segments 120, which may be rubber, plastic or similar material. Skirt 22 is preferably tension fit over the outer periphery of bottom plate 44, and serves to prevent splashing of water from brush 38.

Preferably, tubing 94 is split at each end to enable clasp 18 to be compression fit over tubing 94 and hose 16.

A principal advantage of the invention resides in its ability to deal with the film of dirt typically remaining after spraying of an automobile during a washing operation. While such spraying is possible with use of the invention with the control switch 20 turned for the spray mode, the invention is also useful for brushing the film left after the spraying process is completed, by the simple manual action of adjusting control switch 20 to the brushing mode of operation.

Attachment 10 can be operated by low water pressure, the water pressure ranging as low as 35 to 40 psig, for use in washing windows, metal buildings, and the like. However, attachment 10 functions best under higher water pressure, such as typically is encountered in commercial or municipal water supplies.

Attachment 10 can be constructed of plastic, lightweight metal, or any equivalent material capable of withstanding the pressures typically encountered in ordinary use. The device is operated by water, requiring no further source of power, such as electricity, internal combustion engines, or the like. Therefore, additional inconvenience, maintenance, expense, and possible hazard to an operator are substantially reduced, while the effort required for various cleaning tasks is minimized.

With use of the invention, the film left from spraying operations alone can be removed without the necessity for spraying under excessive pressure, such forceful sprays sufficient to dislodge the film being capable of causing damage to paint, chromium moldings, or decals in some instances. Further, the water driven motor of the invention can be designed for high pressure, and can enable the brush to rotate at a moderate speed of revolution when applied to surfaces. The attachment of the present invention is adapted particularly for self-service drive-in car wash units and shops which utilize high pressure water units for washing trucks, trailers, and the like. With use of the water powered motor disclosed hereinabove, water consumption is reduced, requiring a lower volume of water in such washing operations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A combination water spray and rotary brush attachment for cleaning a surface by spraying or brushing, the attachment being connected to a source of water supply under pressure for forming the spray and for powering the brush, wherein the attachment comprises housing means for receiving water under pressure, spray means communicating with a spray water line contained within the housing means, and brushing means communicating with a brush water line attached to the housing means and including a brushing assembly and water powered drive means connected to the brushing assembly for imparting rotary motion to the brushing assembly, control means on the housing for switching the direction of water from said spray means to said brush means, the drive means being powered by water supplied through the control means and the brushing assembly being lubricated by water also used to power the drive means, said control means comprising a hollow cylindrical body provided with a pair of spaced water control outlets, one of said outlets for directing water to said spray water line and the other of said outlets for directing water to said brush water line, said body being further provided with a water intake port for introducing water into said hollow cylindrical body, whereby the direction of the water introduced into said hollow body can be controlled to flow into the spray water line or said brush water line, said drive means comprising a power disk having about its periphery a plurality of pockets, the pockets receiving water from said brush water line to an inlet in the housing means, whereby the power disk is rotatable to impart rotary motion to the brush assembly, said brush assembly comprising a circular brush plate receiving a plurality of fiber bundles for exerting brushing action, the brush plate being connected by shaft means to the power disk, the housing means further including a bottom plate disposed between the brush plate and the power disk, the bottom plate having a bottom plate orifice for removing water directed into said pockets of the power disk.

2. The attachment of claim 1 wherein said housing means further comprises a flat circular top plate having an outer rim on which said bottom plate is attachable, said top plate having a ridge provided with said spray water line with an orifice for directing a water spray outwardly when said control means provides said pressurized water to said spray water line, said top plate further including said brush water line for conducting water from said pressurized water supply when said control means permits entry of water into the brush water line, said brush water line terminating at said inlet, whereby water from the brush water line is directable into said pockets of the power disk for rotation of the brush assembly.

3. The attachment of claim 2 wherein said shaft means comprises a threaded projection attachable into a compatibly threaded hole in said brush plate, the threaded projection having a slot for holding the shaft means stationary during removal or attachment of the brush plate therefrom, the shaft means further comprising a spacing segment parallel with said bottom plate, a bearing segment for separating said bottom plate from said power disk and permitting rotation of the disk with respect to the bottom plate, and a semi-cylindrical pin for insertion within a compatibly shaped centrally located hole in said power disk, the power disk and brush assembly being in secure mechanical communication thereby.

4. The attachment of claim 3 wherein said housing means further includes a protective skirt attached about the periphery thereof, whereby splashing from said brush assembly is substantially preventable.

5. The device of claim 4 wherein said bottom plate is provided with an upwardly directed rim, the rim being threaded internally, the top plate of the housing means having an exteriorly threaded outer edge, the bottom plate being attachable on the outer edge of the housing means.

6. The attachment of claim 4 wherein said housing means further includes a receiving pipe defining an entrance passageway for introduction of pressurized water to said control means, said receiving pipe being covered by a flexible hose, said flexible hose being secured to said receiving pipe by being covered by a length of rigid tubing, said rigid tubing being slit at each end, said hose being attached to said receiving pipe by means of a clasp placed around one end of said rigid tubing, said flexible hose having inserted therein a section of a supply pipe, said hose being secured to said section of supply pipe by a second clasp placed around said rigid tubing at a position spaced from said first clasp, whereby water under pressure is introduced into said inserted supply pipe and through said hose to said receiving pipe, said clasps being disposed over said rigid pipe preventing leaks and forming a watertight seal between said inserted water supply pipe and said receiving pipe.

7. The attachment of claim 1 wherein said control means comprises a piston received within said hollow cylindrical body, the piston being movable longitudinally within said body by a cable means, said body having walls containing said water control outlets disposed along its length, said piston contacting said walls whereby selection of the position of the piston within said body enables control of the flow of the pressurized water from said body into the brush waterline or the spray waterline.

8. The attachment of claim 1 wherein said cylindrical body is placed in said housing for rotation therein, said body having attached thereto a handle for manual external rotation thereof, said water control outlets being capable of registering with the respective waterlines whereby selection of the position of said handle enables control of the flow of the pressurized water from said body into the brush waterline or the spray waterline.

* * * * *